(12) United States Patent
Himetani (10) Patent No.: US 7,690,279 B2
(45) Date of Patent: Apr. 6, 2010

(54) VEHICLE-PEDAL BACKWARD-DISPLACEMENT PREVENTING DEVICE

(75) Inventor: Yoshiro Himetani, Toyota (JP)

(73) Assignee: Toyoda Iron Works, Co., Ltd., Toyota-shi, Aichi-ken (JP)

( * ) Notice: Subject to any disclaimer, the term of this patent is extended or adjusted under 35 U.S.C. 154(b) by 854 days.

(21) Appl. No.: 11/204,046

(22) Filed: Aug. 16, 2005

(65) Prior Publication Data
US 2007/0000708 A1 Jan. 4, 2007

(30) Foreign Application Priority Data
Jul. 1, 2005 (JP) ............................. 2005-193429

(51) Int. Cl.
*G05G 1/32* (2008.04)
(52) U.S. Cl. .......................................... 74/512; 180/281
(58) Field of Classification Search .................. 74/512, 74/513, 560; 180/271, 274, 281, 315, 316
See application file for complete search history.

(56) References Cited

U.S. PATENT DOCUMENTS

| 5,848,558 | A | * | 12/1998 | Isono et al. | .................. 74/512 |
| 5,983,746 | A |   | 11/1999 | Nawata et al. |   |
| 5,996,440 | A |   | 12/1999 | Nawata et al. |   |
| 6,006,626 | A |   | 12/1999 | Notake et al. |   |
| 6,041,674 | A |   | 3/2000  | Kato |   |
| 6,055,883 | A | * | 5/2000  | Kato | ........................ 74/512 |
| 6,101,894 | A | * | 8/2000  | Tiemann et al. | ............... 74/512 |
| 6,339,971 | B1 |  | 1/2002  | Kato |   |
| 6,408,711 | B1| * | 6/2002  | Mizuma et al. | ............... 74/512 |
| 6,742,411 | B2| * | 6/2004  | Aoki et al. | .................... 74/512 |
| 6,810,766 | B2| * | 11/2004 | Mizuma | ....................... 74/512 |
| 7,275,614 | B2| * | 10/2007 | Hayashi | ...................... 180/274 |

(Continued)

FOREIGN PATENT DOCUMENTS
EP 0 803 420 10/1997

(Continued)

OTHER PUBLICATIONS

European Search Report dated Nov. 22, 2006.

*Primary Examiner*—Vicky A Johnson
(74) *Attorney, Agent, or Firm*—Finnegan, Henderson, Farabow, Garrett & Dunner, LLP (57) ABSTRACT

A vehicle-pedal backward-displacement preventing device including: (a) a pedal bracket supporting an operating pedal having a depressible portion; (b) upper and lower attachments fixed to the pedal bracket, such that the pedal bracket is attached to a dash panel through the attachments; and (c) a guide member fixed to the pedal bracket or a vehicle body member and is operable to restrain, in event of backward movement of the pedal bracket together with the dash panel toward a driver's seat, the depressible portion of the operating pedal from being backwardly displaced toward the driver's seat, by causing a distal end portion of the pedal bracket to be downwardly displaced. The pedal bracket has a separation portion located in vicinity of the upper attachment, such that the pedal bracket is breakable at the separation portion by a load generated in the event of the backward displacement of the dash panel, thereby separating the upper attachment from the pedal bracket, and allowing the pedal bracket to be pivoted about the lower attachment in a direction causing the distal end portion of the pedal bracket to be downwardly displaced.

14 Claims, 2 Drawing Sheets

| U.S. PATENT DOCUMENTS | | | | JP | 10-175492 A | 6/1998 |
|---|---|---|---|---|---|---|
| 2004/0003674 A1 | 1/2004 | Endo et al. | | JP | 2005-138613 | 6/2005 |
| 2004/0040409 A1* | 3/2004 | Nebuya et al. ............... 74/560 | | JP | 2005-186803 | 7/2005 |
| | | | | JP | 2005-193429 | 7/2005 |

FOREIGN PATENT DOCUMENTS

FR     2 779 112     5/1998

\* cited by examiner

VEHICLE-PEDAL BACKWARD-DISPLACEMENT PREVENTING DEVICE

This application is based on Japanese Patent Application No. 2005-193429, the content of which is incorporated hereinto by reference.

BACKGROUND OF THE INVENTION

1. Field of the Invention

The present invention relates to a vehicle-pedal backward-displacement preventing device for preventing a depressible portion of an operating pedal from being backwardly displaced toward a driver's seat in the event of displacement of a dash panel toward the driver's seat.

2. Discussion of Prior Art

There has been proposed a vehicle-pedal backward-displacement preventing device having: (a) a pedal bracket which is integrally fixed to a dash panel through a plurality of attachments provided in the pedal bracket and spaced apart from each other in a vertical direction, and which is provided with a support portion extending toward a driver's seat; (b) an operating pedal disposed pivotably in the support portion of the pedal bracket, and having a depressible portion which is provided in its lower end portion and which is to be depressed whereby the operating pedal is operated; and (c) a guide member disposed in relation to the pedal bracket and a vehicle body member, and restraining, in event of backward displacement of the pedal bracket together with the dash panel toward the driver's seat, the depressible portion of the operating pedal from being backwardly displaced toward the driver's seat, by causing a distal end portion of the pedal bracket to be downwardly pressed as a result of displacement of the pedal bracket relative to the vehicle body member.

As an example of the vehicle-pedal backward-displacement preventing device, JP-H10-175492A describes a device for preventing a backward displacement of a brake pedal as the operating pedal. In the described device, the support portion of the pedal bracket extends in an obliquely upward direction, and is connected at its distal end portion to the guide member (slide plate) that is fixed to an instrument panel reinforcement member as the vehicle body member. In the event of displacement of the dash panel toward the driver's seat which displacement is caused, for example, with impact of a large load to the dash panel in a direction from the vehicle front to the rear, the pedal bracket is disconnected from the guide member, and the distal end portion of the disconnected pedal bracket is forced by the guide member to downwardly displaced. As a result of the downward displacement of the distal end portion of the pedal bracket, the pedal bracket buckles to be bent, while its lower attachment buckles to be crushed, whereby the brake pedal as the operating pedal is pivoted about a fulcrum provided by its connected portion at which the brake pedal is connected to an operating rod. The brake pedal is thus pivoted about its connected portion as the fulcrum such that its depressible portion is relatively displaced toward the front of the vehicle.

In recent years, there has been studied an employment of a pedal bracket that is formed of a synthetic resin such as glass-fiber reinforced resin, for example, for the purpose of reducing its weight. Such a resin pedal bracket is provided with a rib or other reinforcing means for obtaining a predetermined degree of rigidity, and the provision of such reinforcing means makes it difficult to cause the pedal bracket to buckle, thereby problematically resulting in an impossibility to sufficiently prevent the backward displacement of the operating pedal. Although it might be possible to construct the pedal bracket with a reduced rigidity for enabling it to buckle, the reduction of the rigidity could cause the pedal bracket to be deformed by a reaction force generated in a usual operation of the operating pedal. That is, it is difficult to establish a suitable degree of rigidity which permits the pedal bracket to buckle in the above-described event while avoiding deformation of the pedal bracket in a usual operation of the operating pedal. Further, in the device described in JP-H10-175492A, the lower attachment is arranged to be able to buckle in the above-described event, so that the pedal bracket can be inclined owing to a difference in deformation amount between the buckling lower attachment and the upper attachment that is compressively deformed. However, the operating pedal can not be sufficiently pivoted only by the inclination of the pedal bracket, which inclination depends on the difference in the deformation amount between the upper and lower attachments.

The present invention was made in the light of the background art discussed above. It is therefore an object of the invention to make it possible to appropriately obtain an effect of prevention of backward displacement of the operating pedal even where the pedal bracket does not buckle.

SUMMARY OF THE INVENTION

For achieving the above object, the first invention is, in a vehicle-pedal backward-displacement preventing device having (a) a pedal bracket which is integrally fixed to a dash panel through a plurality of attachments provided in the pedal bracket and spaced apart from each other in a vertical direction, and which is provided with a support portion extending toward a driver's seat; (b) an operating pedal disposed pivotably in the support portion of the pedal bracket, and having a depressible portion which is provided in its lower end portion and which is to be depressed whereby the operating pedal is operated; and (c) a guide member disposed in relation to the pedal bracket and a vehicle body member, and restraining, in event of backward displacement of the pedal bracket together with the dash panel toward the driver's seat, the depressible portion of the operating pedal from being backwardly displaced toward the driver's seat, by causing a distal end portion of the pedal bracket to be downwardly pressed as a result of displacement of the pedal bracket relative to the vehicle body member, characterized by including (d) a separation portion provided in vicinity of an upper attachment of the plurality of attachments of the pedal bracket, such that the pedal bracket is breakable at the separation portion by a load that is to be generated in the event of the backward displacement of the dash panel, thereby separating the upper attachment from the pedal bracket and allowing the pedal bracket to be pivoted by function of the guide member about a lower attachment as a fulcrum in such a manner that causes the distal end portion to be downwardly displaced.

It is preferable that the depressible portion of the operating pedal is restrained from being backwardly displaced in the event of deformation of the dash panel, so as to be positioned in a position which is substantially the same as an original position of the depressible portion or which is located on the front side of the original position of the depressible portion. However, the depressible portion may be backwardly displaced toward the driver's seat (toward the rear of the vehicle), as long as an amount of the backward displacement of the depressible portion toward the driver's seat is reduced as a result of application of the present invention.

The second invention is, in the vehicle-pedal backward-displacement preventing device of the first invention, characterized in that the pedal bracket is provided with a stopper that is to be brought into contact with the dash panel, for restraining the pedal bracket from being pivoted about the lower attachment as the fulcrum in such a manner that causes the distal end portion of the pedal bracket to be upwardly displaced, as a result of breakage of the pedal bracket at the separation portion.

The third invention is, in the vehicle-pedal backward-displacement preventing device of the first or second invention, characterized in that the pedal bracket is integrally formed of a synthetic resin material.

In the vehicle-pedal backward-displacement preventing device according to the invention, the separation portion is provided in vicinity of the upper attachment, such that the pedal bracket is breakable at the separation portion due to a load exerted on the pedal bracket by the backward displacement of the dash panel, thereby separating the upper attachment from the pedal bracket and consequently allowing the pedal bracket to be pivoted by function of the guide member about the lower attachment as the fulcrum in such a manner that causes the distal end portion to be downwardly displaced. This arrangement enables a pivot amount (inclination angle) of the pedal bracket to be larger than in a conventional arrangement in which displacement of the pedal bracket is permitted by buckling of the lower attachment, thereby making it possible to sufficiently obtain an effect of prevention of the backward displacement of the operating pedal. Further, in the device according to the invention, since the pedal bracket per se does not have to be made to buckle, the pedal bracket can be given a rigidity large enough to stand a reaction force exerted thereon in an operation of the operating pedal. Thus, even where the pedal bracket is formed of the synthetic resin material, it is possible to easily determine a degree of rigidity, namely, to design its thickness and arrangement of ribs or the like.

In the second invention, the stopper is provided in the pedal bracket, so that the pedal bracket is restrained from being pivoted about the lower attachment as the fulcrum in such a manner that causes the distal end portion of the pedal bracket to be upwardly displaced. It is therefore assuredly avoid, in a case such as breakage of the pedal bracket at the separation portion, the depressible portion of the operating pedal from protruding toward the driver's seat, since the upward displacement of the distal end portion of the pedal bracket is restrained. For example, in an arrangement in which the pedal bracket is connected at its support portion to the vehicle body member such as a cowling such that the pedal bracket can be disconnected from the vehicle body member in the event that a load not smaller than a predetermined amount is applied to the pedal bracket in a direction from the vehicle front to the rear, if the pedal bracket is broken at the separation portion before the disconnection of the pedal bracket from the vehicle body member, there is a possibility that the pedal bracket might be pivoted relative to the vehicle body member in a manner causing the distal end portion to be upwardly displaced and consequently causing the depressible portion of the operating pedal to protrude toward the driver's seat. Owing to the provision of the above-described stopper, however, it is possible to reliably prevent the pedal bracket from being pivoted in such a manner that causes displacement of the operating pedal in the undesirable direction.

The present invention is advantageously applied to, for example, a brake pedal of a service braking system in which an operating rod of a brake booster is connected to a vertically intermediate portion of the operating pedal. However, the invention is equally applicable also to other operating pedal for a vehicle such as an accelerator pedal, a clutch pedal and a brake pedal of a parking braking system.

The pedal bracket is constructed to have, for example, a flat-plate-like base plate, which is to be integrally fixed to the dash panel through the plurality of attachments, with its posture being held in substantially parallel to the dash panel. The support portion is provided by, for example, a pair of side plates, which are held in substantially perpendicular to the base plate, with their postures being held in substantially parallel to each other. The operating pedal is provided to be pivotable about an axis of a support shaft, which is provided to connect the pair of side plates and extends substantially horizontally.

Although the pedal bracket is preferably provided by a member integrally formed of a synthetic resin material, for example, as in the third invention, it may be formed of a light metal material such as aluminum alloy and magnesium alloy. Further, the present invention can be applied also to a conventional pedal bracket made of a steel. The attachments may be formed integrally with the pedal bracket, or may be formed independently of the pedal bracket. Where the attachments are formed independently of the pedal bracket, the formed attachments may be fixed integrally to the pedal bracket, for example, by press fitting or the like.

The separation portion is provided by a portion in which, for example, a groove having a predetermined depth, a slit or the like is formed to facilitate breakage of the pedal bracket. The separation portion may be configured to cause the upper attachment to be completely separated from the pedal bracket, or alternatively, may be configured to cause the upper attachment to be partially separated from the pedal bracket. In the latter case, the separation portion may be provided by, for example, a U-shaped or inverted U-shaped portion located to substantially surround the upper attachment, so that such a portion substantially surrounding the upper attachment can be separated from the dash panel. In other words, the upper attachment, through which the pedal bracket is fixed to the dash panel, may be arranged to be removed at least its portion from the pedal bracket such that the pedal bracket can be pivoted about the lower attachment as the fulcrum by a predetermined amount in such a direction causing the distal end portion of the pedal bracket to be downwardly displaced.

The vehicle body member, which serves to downwardly force the distal end portion of the pedal bracket through the guide member, is less likely to be displaced backwardly toward the driver's seat in the event of impact of a large load in a direction from the vehicle front to the rear, than the dash panel. The vehicle body member is preferably provided by an instrument panel reinforcement member (i.e., member reinforcing an instrument panel of the vehicle), a cowling or the like. The distal end portion of the pedal bracket is forced to be displaced downwardly as a result of displacement of the dash panel relative to the vehicle body member. It is noted that the dash panel is a partition wall separating a passenger compartment and an engine room of the vehicle from each other.

The guide member is provided in one of the pedal bracket and the vehicle body member, and is slidably engaged with the other of the pedal bracket and the vehicle body member. The guide member is constructed to have a slide surface or the like, so that the distal end portion of the pedal bracket can be smoothly displaced in the downward direction, following a predetermined displacement path which is defined by the slide surface or the like of the guide member. However, the guide member may be provided by a linkage which links the distal end portion of the pedal bracket and the vehicle body member to each other and which is arranged to press the pedal bracket downwardly as a result of movement of the pedal bracket relative to the vehicle body member.

The pedal bracket and the vehicle body member may be arranged such that the distal end portion of the pedal bracket and the vehicle body member are displaceable relative to each other, or alternatively, may be arranged to be connected with each other through a connecting device so that the pedal bracket is fixedly positioned relative to the vehicle body member. In the latter arrangement, the pedal bracket and the vehicle body member may be arranged to be disconnected from each other so that the pedal bracket is displaced relative to the vehicle body member, in the event of impact of a predetermined amount of load to the pedal bracket in the direction from the vehicle front to the rear. The connecting device may be provided by a bolt or other breakable member which is breakable with impact of a predetermined amount of load thereto, a frictional engagement member which is held in frictional engagement with a slit or the like by a bolt tightening load and which slips to be disengaged from the slit or the like with impact of a predetermined amount of load thereto, or a deformable member which is deformable with impact of a predetermined amount of load thereto so as to permit displacement of the distal end portion of the pedal bracket relative to the vehicle body member.

DETAILED DESCRIPTION OF THE INVENTION

There will be described in detail embodiments of the present invention, with reference to the drawings.

Figure 1A:
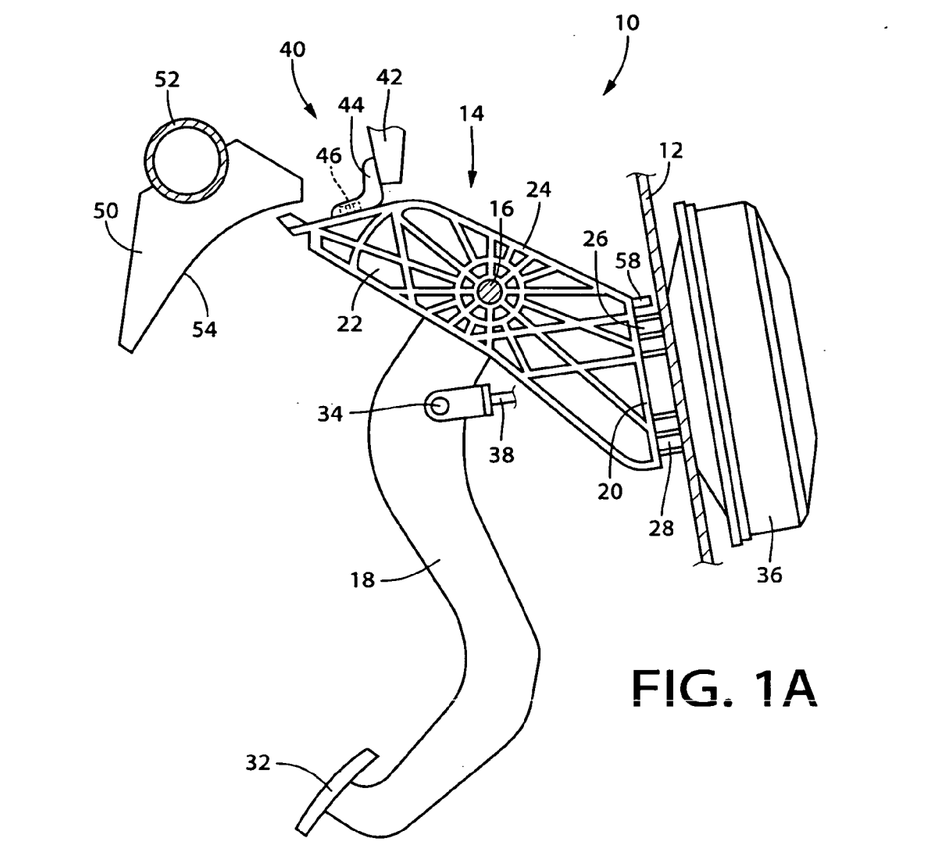
FIG. 1A is a right side view for explaining a brake pedal apparatus to which the present invention is applied.

FIG. 1A is a right side view schematically showing a brake pedal apparatus 10 to which the present invention is applied and which is to be used for a service braking system of a vehicle. This brake pedal apparatus 10 includes: a pedal bracket 14 integrally fixed to a dash panel 12 which extends vertically to separate a passenger compartment and an engine room of the vehicle from each other; a support shaft 16 provided in the pedal bracket 14 so as to extend substantially in a horizontal direction and substantially in parallel with a transversal direction of the vehicle; and an operating pedal 18 provided to be pivotable about an axis of the support shaft 16. The operating pedal 18 is pivotably attached at its upper end portion to the support shaft 16. When a depressible portion 32 provided by a lower end portion of the operating pedal 18 is depressed in a forward direction (i.e., the rightward direction as seen in FIG. 1A), an operating rod 38 of a brake booster 36 is forwardly pressed through a connecting pin 34 that connects the operating rod 38 to a vertically intermediate portion of the operating pedal 18, for thereby generating a braking force.

The pedal bracket 14 includes: a flat-plate-like base plate 20; a pair of side plates 22 which are spaced apart from each other in the horizontal direction and which are substantially parallel to each other and substantially perpendicular to the base plate 20; and a back plate 24 which connects upper ends of the side plates 22 so as to cooperate with the side plates 22 for having a U-shaped cross sectional shape. The base plate 20 is integrally fixed to the dash panel 12 through a pair of upper attachments 26 and a pair of lower attachments 28 which are spaced apart from the upper attachments 26 in a vertical direction, such that the base plate 20 is held in substantially parallel to the dash panel 12. The pair of side plates 22 cooperate to constitute a support portion, and are provided to extend from the base plate 20 that is attached to the dash panel 12, in an obliquely upward direction toward the driver's seat. The support shaft 16 is provided to connect the pair of side plates 22.

Figure 1B:
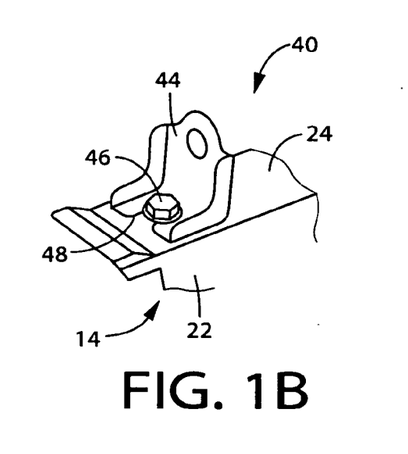
FIG. 1B is a perspective view of a connecting device.
Figure 1C:
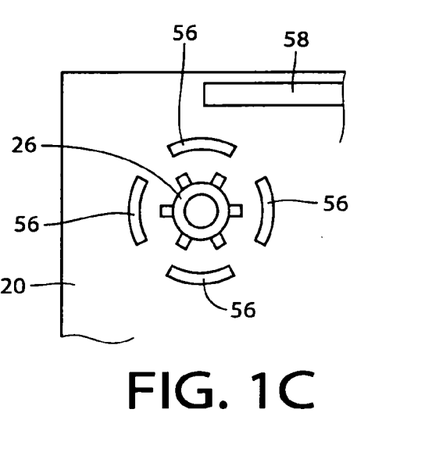
FIG. 1C is a front view showing breakage facilitating grooves formed in a pedal bracket.

The pedal bracket 14 is integrally formed of a synthetic resin such as glass-fiber reinforced resin, and has a multiplicity of ribs provided in the side plates 22 so as to obtain a predetermined rigidity. As shown in FIG. 1C, each of the attachments 26, 28 is a cylindrical metal member having an introduction hole, and is integrally fixed to the base plate 20 by press fitting. The brake booster 36 is disposed on one of opposite sides of the dash panel 12 that is remote from the pedal bracket 14, namely, disposed in the engine room. The brake booster 36 and the pedal bracket 14 are integrally fixed to each other by bolts (not shown) that are introduced through the introduction holes of the respective attachments 26, 28, with the dash panel 12 being interposed therebetween.

Figure 2:
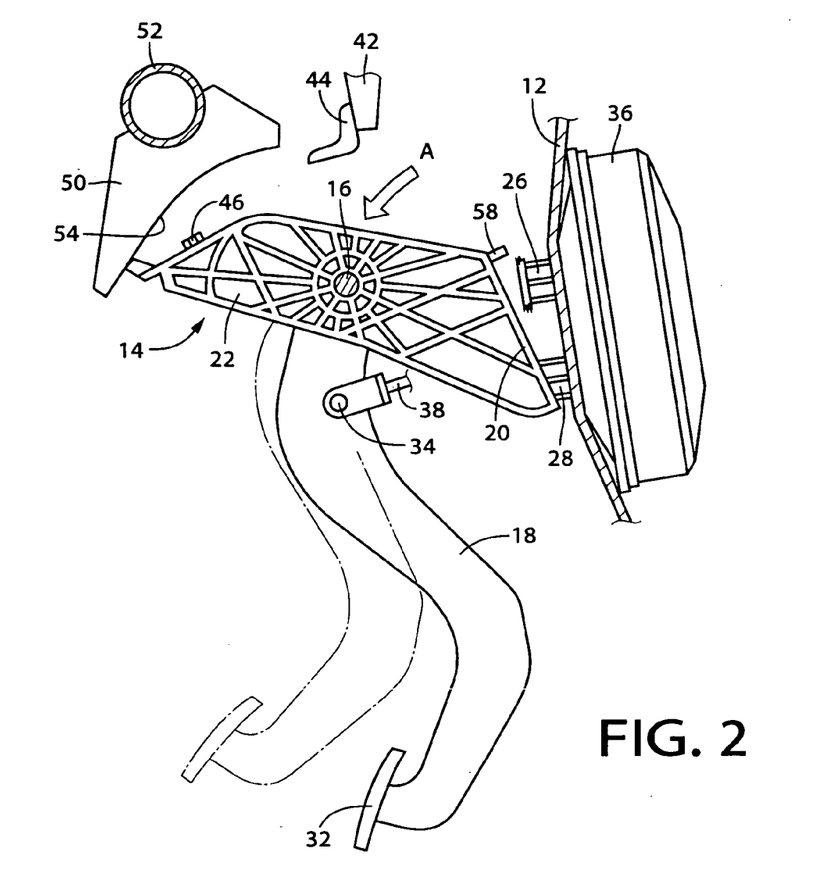
FIG. 2 is a view showing, in the brake pedal apparatus of FIG. 1A, an operation state of a backward-displacement preventing device in which the pedal bracket is broken at its portion formed with the breakage facilitating grooves, whereby an upper attachment is separated from the pedal bracket, and the pedal bracket is pivoted about a lower attachment as a fulcrum.

The pedal bracket 14 is removably connected at its distal end portion, through a connecting device 40, to a support member 42 that is integrally fixed to a cowling (not shown). The connecting device 40 includes: a L-shaped connecting member 44 made of a metal and integrally fixed to the support member 42 by a bolt (not shown); and a bolt 46 connecting the connecting member 44 and the distal end portion of the pedal bracket 14, specifically, connecting the connecting member 44 and the back plate 24 of the pedal bracket 14. As shown in FIG. 1B, the connecting member 44 is formed with a slit 48 that opens toward the rear of the vehicle. The bolt 46 is arranged to pass through the slit 48, and is held in frictional engagement, by its screw tightening, with portions of the connecting member 44 that are located on opposite sides of the slit 48, whereby the pedal bracket 14 is connected to the connecting member 44. When a predetermined amount of breakaway load is applied to the pedal bracket 14 toward the rear of the vehicle, i.e., in the leftward direction as seen in FIGS. 1A and 1B, the connecting member 44 is made to slip to cause the bolt 46 to be removed from the above-described portions of the connecting member 44 located on the opposite sides of the slit 48, whereby the connection of the pedal bracket 14 and the support member 42 is released as shown in FIG. 2.

The above-described predetermined amount of breakaway load corresponds to such an amount that allows removal of the pedal bracket 14 from the support member 42 based on displacement of the dash panel 12 relative to the cowling which is caused in the event of displacement of the dash panel 12 toward the driver's seat, for example, due to application of a large load thereto in the direction from the vehicle front to the rear. The cowling provided with the support member 42 is a vehicle body member that is less likely to be displaced toward the rear of the vehicle in the event of impact of a large load in the direction from the vehicle front to the rear, than the dash panel 12. Owing to the displacement of the cowling and the dash panel 12 relative to each other, the pedal bracket 14 is removed from the support member 42.

A guide member 50 is provided on a side of the distal end portion of the pedal bracket 14 that is to be removed from the support member 42 as described above, namely, on a rear side of the pedal bracket 14 as viewed in the direction from the vehicle front to the rear. The guide member 50 is integrally fixed to an instrument panel reinforcement member 52 as another vehicle body member, and has a slide surface 54 provided in its portion opposed to the pedal bracket 14, namely, in a front portion as viewed in a vehicle running direction. The slide surface 54 is inclined gradually downwardly as viewed in the direction from the vehicle front to the rear. Like the above-described cowling, the instrument panel reinforcement member 52 is less likely to be displaced toward the rear of the vehicle in the event of impact of a large load in the direction from the vehicle front to the rear, than the dash panel 12. When the pedal bracket 14 disconnected from the support member 42 is moved together with the dash panel 12 toward the driver's seat, the pedal bracket 14 is brought into engagement at its distal end portion with the slide surface 54 of the guide member 50, and the distal end portion of the pedal bracket 14 is guided and forced by the slide surface 54 of the guide member 50 to be displaced in the obliquely downward direction, as shown in FIG. 2.

Owing to the provision of the multiplicity of ribs in the pair of side plates 22 of the pedal bracket 14, the rigidity of the side plates 22 is increased, so that the side plates 22 do not buckle even when the distal end portion of the pedal bracket 14 is forced downwardly by the guide member 50. Meanwhile, in the present embodiment, as shown in FIG. 1C breakage facilitating grooves 56 are formed in a portion of the base plate 20 surrounding each of the pair of upper attachments 26, namely, the grooves 56 cooperate to form a dotted line surrounding each of the pair of upper attachments 26, so that the base plate 20 is broken at the portion or line in the event of application of an excessively large load thereto, whereby each of the upper attachments 26 is separated from the base plate 20. That is, as shown in FIG. 2, the distal end portion of the pedal bracket 14 removed from the support member 42 is brought into engagement with the slide surface 54 of the guide member 50, and is then forced to be downwardly displaced by function of the slide surface 54. The downward displacement of the distal end portion of the pedal bracket 14 causes the base plate 20 to be torn at the dotted line defined by the grooves 56 and each of the upper attachments 26 to be separated from the base plate 20. The separation of the upper attachments 26 from the base plate 20 allows the pedal bracket 14 to be pivoted about the lower attachments 28 as a fulcrum in a direction, as indicated by white arrow A, causing the distal end portion of the pedal bracket 14 to be downwardly displaced. It is noted that the grooves 56 cooperating to form the dotted line have a depth and a spacing interval that enable the breakage of the base plate 20 and the separation of the upper attachments 26 in the event of application of a predetermined amount of load.

When the pedal bracket 14 is pivoted downwardly about the lower attachments 28 as the fulcrum, as described above, the operating pedal 18 connected at its upper end portion to the support shaft 16 is pivoted in a counterclockwise direction about a fulcrum in the form of its intermediate portion at which the operating pedal 18 is connected to the operating rod 38 (through the connecting pin 34). With the operating pedal 18 being counterclockwise pivoted about its intermediate portion, the depressible portion 32 of the operating pedal 18 is relatively displaced in a direction toward the front of the vehicle (i.e., in the rightward direction as seen FIG. 2). Thus, the depressible portion 32 is restrained from being backwardly displaced toward the driver's seat. Since the operating rod 38 projects from the dash panel 12 (brake booster 36) by a distance that is held in substantially constant irrespective of displacement (pivot motion) of the pedal bracket 14, the operating pedal 18 is counterclockwise pivoted about the connecting pin 34 as the fulcrum as a result of displacement of the support shaft 16. As represented by solid line in FIG. 2, the operating pedal 18 is pivoted as a result of the pivot motion of the pedal bracket 14, in such a manner that causes the depressible portion 32, i.e., the lower end portion of the operating pedal 18 to be displaced toward the front of the vehicle, in contrast to a case in which the operating pedal 18 is backwardly displaced in a parallel manner without the pedal bracket 14 being pivoted, as indicated by one-dot chain line representing a posture of the operating pedal 18 in that case. In the present embodiment, the guide member 50, the breakage facilitating grooves 56 and the connecting device 40 cooperate to constitute a backward-displacement preventing device, while the breakage facilitating grooves 56 cooperate to constitute a separation portion.

The provision of the breakage facilitating grooves 56 around each of the upper attachments 26 leads to reduction in strength with which the pedal bracket 14 is attached to the dash panel 12, namely, reduction in strength with which the operating pedal 18 is supported. In the present embodiment, however, each portion of the pedal bracket 14 has configuration and rigidity which are designed to enable to the lower attachments 28 and the connecting device 40 to provide a desired attaching strength. It is preferable that the base plate 20 is broken at the above-described portion in which the breakage facilitating grooves 56 are formed, when the pedal bracket 14 is brought into contact with the guide member 50 after having being removed from the support member 42. However, depending upon a manner of application of a large load, there is a possibility that the base plate 20 would be broken before the removal of the pedal bracket 14 from the support member 42. In such a case, the pedal bracket 14 would be pivoted in the clockwise direction as seen in FIG. 1A, causing the distal end portion of the pedal bracket 14 to be displaced upwardly relative to the dash panel 12. That is, there is a possibility that the depressible portion 32 of the operating pedal 18 would be displaced toward the driver's seat, or that smooth movement of the distal end portion of the pedal bracket 14 along the slide surface 54 in the downward direction would be impeded when the distal end portion of the pedal bracket 14 is brought into engagement with the guide member 50 after having removed from the support member 42. In view of such a possibility, in the present embodiment, a stopper 58 is provided to protrude from an upper end portion of the base plate 20 toward the dash panel 12, so as to be brought into contact with the dash panel 12, for stopping the clockwise pivot motion of the pedal bracket 14 which upwardly displaces the distal end portion of the pedal bracket 14.

Thus, in the vehicle-pedal backward-displacement preventing device according to the present embodiment, the breakage facilitating grooves 56 are formed in the portion of the base plate 20 surrounding each of the pair of upper attachments 26, such that the pedal bracket 14 is breakable at the separation portion due to a load exerted on the pedal bracket 14 by the backward displacement of the dash panel 12, thereby separating the upper attachments 26 from the pedal bracket 14 and consequently allowing the pedal bracket 14 to be pivoted by function of the guide member 50 about the lower attachments 28 as the fulcrum in such a manner that causes the distal end portion of the pedal bracket 14 to be downwardly displaced as indicated by arrow A in FIG. 2. This arrangement enables a pivot amount (inclination angle) of the pedal bracket 14 to be larger than in a conventional arrangement in which displacement of the pedal bracket 14 is caused by buckling of the lower attachments 28, thereby making it possible to sufficiently obtain an effect of prevention of the backward displacement of the operating pedal 18.

Further, in the device according to the invention, since the pedal bracket 14 per se does not have to be made to buckle, the pedal bracket 14 can be given a rigidity large enough to stand a reaction force exerted thereon in an operation of the operating pedal 18. It is therefore possible to easily determine a degree of rigidity of the pedal bracket 14 formed of the synthetic resin material, namely, to easily design its thickness and arrangement of ribs or the like.

Further, in the present embodiment, the stopper 58 is provided in the upper end portion of the base plate 20, so that the pedal bracket 14 is restrained by contact of the stopper 58 with the dash panel 12, from being pivoted about the lower attachments 28 as the fulcrum in such a manner that causes the distal end portion of the pedal bracket 14 to be upwardly displaced. It is therefore assuredly avoid, in a case such as breakage of the base plate 20 at the separation portion in which the breakage facilitating grooves 56 are formed, the depressible portion 32 of the operating pedal 18 from protruding toward the driver's seat, since the upward displacement of the distal end portion of the pedal bracket 14 is restrained. In the present embodiment in which the pedal bracket 14 is connected at its distal end portion to the support member 42 through the connecting device 40 wherein the connection of the pedal bracket 14 and the support member 42 is released when a predetermined amount of breakaway load is applied to the pedal bracket 14, there is a possibility that the base plate 20 would be broken at the breakage facilitating grooves 56 before the removal of the pedal bracket 14 from the support member 42, depending upon a manner of application of a large load thereto. In such a case, the pedal bracket 14 would be pivoted about the lower attachments 28 as the fulcrum in the clockwise direction as seen in FIG. 1A, causing the distal end portion of the pedal bracket 14 to be displaced upwardly relative to the dash panel 12. Thus, there is a possibility that the depressible portion 32 of the operating pedal 18 would protrude toward the driver's seat. Owing to the provision of the stopper 58, however, it is possible to reliably prevent the pedal bracket 18 from being pivoted in such a manner causing displacement of the operating pedal 18 in the undesirable direction.

Figure 3:
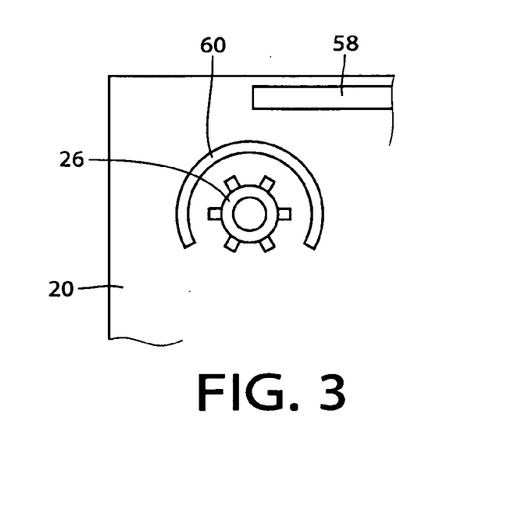
FIG. 3 is a view corresponding to the view of FIG. 1C, for explaining another example of the breakage facilitating groove.

In the above-described embodiment, the separation portion is provided by the portion of the base plate 20 in which the breakage facilitating grooves 56 are arranged to form the dotted line. However, the grooves 56 may be replaced by slits arranged to from a dotted line and to penetrate through the base plate 20. Further, as shown in FIG. 3, a semicircular-shaped breakage facilitating groove 60 may be arranged to surround an upper half of each of the upper attachments 26, or a slit having substantially the same shape as the groove 60 may be formed.

The embodiment of the present invention has been explained in detail with reference to the drawings. However, the explained embodiment is merely an embodied form, and the present invention can be embodied with various modifications and improvements on the basis of knowledge of those skilled in the art.

The invention claimed is:

1. A vehicle-pedal backward-displacement preventing device, comprising:
   a pedal bracket pivotally supporting an operating pedal, the operating pedal having a lower end portion depressed by a vehicle operator, the pedal bracket including a base portion attached to a vehicle dash panel via an upper attachment and a lower attachment, an upper portion, a support portion, and a distal end portion projecting away from the upper and lower attachments toward a vehicle seat;
   a guide member fixed to one of the pedal bracket and a vehicle body member, the guide member having a sliding surface provided between the distal end portion and the vehicle seat, and facing the distal end portion;
   a first separation portion provided on the upper portion of the pedal bracket, the first separation portion configured to break upon application of a predetermined load thereto caused by engagement between the distal end portion and the sliding surface resulting from movement of the pedal bracket and the dash panel toward the vehicle seat, thereby bringing the distal end portion into contact with the sliding surface of the guide member, downwardly displacing the distal end portion alone the sliding surface, and preventing movement of the operating pedal toward the vehicle seat; and
   a second separation portion provided on the base portion of the pedal bracket surrounding the upper attachment, the second separation portion configured to break upon application of a predetermined load thereto, thereby allowing the pedal bracket to pivot about the lower attachment, downwardly displacing the pedal bracket, and preventing movement of the operating pedal toward the vehicle seat.

2. The vehicle-pedal backward-displacement preventing device according to claim 1, further comprising a stopper which is fixed to the pedal bracket and which is to be brought into contact with the dash panel, for restraining the pedal bracket from being pivoted about the lower attachment in a direction that causes the distal end portion of the pedal bracket to be upwardly displaced, as a result of breakage of the pedal bracket at the second separation portion.

3. The vehicle-pedal backward-displacement preventing device according to claim 2, wherein the pedal bracket is formed of a synthetic resin material.

4. The vehicle-pedal backward-displacement preventing device according to claim 2,
   wherein each of the upper and lower attachments is provided by a substantially cylindrical member extending between the dash panel and the base portion,
   and wherein the stopper is provided by a protrusion which protrudes from the base portion toward the dash panel and which is located on one of opposite sides of the upper attachment.

5. The vehicle-pedal backward-displacement preventing device according to claim 1, wherein the pedal bracket is formed of a synthetic resin material.

6. The vehicle-pedal backward-displacement preventing device according to claim 1,
   wherein the operating pedal is pivotably supported on the support portion,
   and wherein the pedal bracket has at least one groove formed in the base portion thereof such that the at least one groove is located in the second separation portion.

7. The vehicle-pedal backward-displacement preventing device according to claim 6, wherein the at least one groove is provided by a plurality of grooves which are arranged in a line surrounding the upper attachment and which are spaced apart from each other.

8. The vehicle-pedal backward-displacement preventing device according to claim 6, wherein the at least one groove is provided by a groove which extends along a line surrounding an upper portion of the upper attachment.

9. The vehicle-pedal backward-displacement preventing device according to claim 1, wherein the sliding surface of the guide member is inclined in a downward direction.

10. The vehicle-pedal backward-displacement preventing device according to claim 1, wherein the sliding surface of the guide member is a concave surface.

11. The vehicle-pedal backward-displacement preventing device according to claim 1, wherein downward displacement of the distal end portion along the sliding surface causes separation of the base portion of the pedal bracket from the upper attachment at the second separation portion.

12. A vehicle-pedal backward-displacement preventing device, comprising:
a pedal bracket pivotally supporting an operating pedal, the operating pedal having a lower end portion depressed by a vehicle operator, the pedal bracket including a base portion attached to a vehicle dash panel via an upper attachment and a lower attachment, an upper portion, a support portion, and a distal end portion projecting away from the upper and lower attachments toward a vehicle seat;
a guide member fixed to one of the pedal bracket and a vehicle body member, the guide member having a sliding surface provided between the distal end portion and the vehicle seat, and facing the distal end portion;
a separation portion provided on the base portion of the pedal bracket, the separation portion configured to break upon application of a predetermined load thereto caused by engagement between the distal end portion and the sliding surface resulting from movement of the pedal bracket and the dash panel toward the vehicle seat, thereby bringing the distal end portion into contact with the sliding surface of the guide member, downwardly displacing the distal end portion along the sliding surface, and preventing movement of the operating pedal toward the vehicle seat;
the operating pedal being pivotably supported on the support portion;
the pedal bracket having at least one groove formed in the base portion thereof such that the at least one groove is located in the separation portion; and
the at least one groove being provided by a plurality of grooves which are arranged in a line surrounding the upper attachment and which are spaced apart from each other.

13. A vehicle-pedal backward-displacement preventing device, comprising:
a pedal bracket pivotally supporting an operating pedal, the operating pedal having a lower end portion depressed by a vehicle operator, the pedal bracket including a base portion attached to a vehicle dash panel via an upper attachment and a lower attachment, an upper portion, a support portion, and a distal end portion projecting away from the upper and lower attachments toward a vehicle seat;
a guide member fixed to one of the pedal bracket and a vehicle body member, the guide member having a sliding surface provided between the distal end portion and the vehicle seat, and facing the distal end portion;
a separation portion provided on the base portion of the pedal bracket, the separation portion configured to break upon application of a predetermined load thereto caused by engagement between the distal end portion and the sliding surface resulting from movement of the pedal bracket and the dash panel toward the vehicle seat, thereby bringing the distal end portion into contact with the sliding surface of the guide member, downwardly displacing the distal end portion along the sliding surface, and preventing movement of the operating pedal toward the vehicle seat;
the operating pedal being pivotably supported on the support portion;
the pedal bracket having at least one groove formed in the base portion thereof such that the at least one groove is located in the separation portion; and
the at least one groove is provided by a groove which extends along a line surrounding an upper portion of the upper attachment.

14. A vehicle-pedal backward-displacement preventing device, comprising:
a pedal bracket pivotally supporting an operating pedal, the operating pedal having a lower end portion depressed by a vehicle operator, the pedal bracket including a base portion attached to a vehicle dash panel via an upper attachment and a lower attachment, an upper portion, a support portion, and a distal end portion projecting away from the upper and lower attachments toward a vehicle seat;
a guide member fixed to one of the pedal bracket and a vehicle body member, the guide member having a sliding surface provided between the distal end portion and the vehicle seat, and facing the distal end portion;
a separation portion provided on the base portion of the pedal bracket, the separation portion configured to break upon application of a predetermined load thereto caused by engagement between the distal end portion and the sliding surface resulting from movement of the pedal bracket and the dash panel toward the vehicle seat, thereby bringing the dital end portion into contact with the sliding surface of the guide member, downwardly displacing the distal end portion along the sliding surface, and preventing movement of the operating pedal toward the vehicle seat;
a stopper which is fixed to the pedal bracket and which is to be brought into contact with the dash panel, for restraining the pedal bracket from being pivoted about the lower attachment in a direction that causes the distal end portion of the pedal bracket to be upwardly displaced, as a result of breakage of the pedal bracket at the separation portion;
each of the upper and lower attachments being provided by a substantially cylindrical member extending between the dash panel and the base portion; and
the stopper being provided by a protrusion which protrudes from the base portion toward the dash panel and being located on one of opposite sides of the upper attachment.

* * * * *

UNITED STATES PATENT AND TRADEMARK OFFICE
CERTIFICATE OF CORRECTION

PATENT NO.        : 7,690,279 B2                                Page 1 of 1
APPLICATION NO.   : 11/204046
DATED             : April 6, 2010
INVENTOR(S)       : Himetani

It is certified that error appears in the above-identified patent and that said Letters Patent is hereby corrected as shown below:

Claim 1, col. 10, line 19, "alone" should read --along--.

Claim 14, col. 12, line 42, "dital" should read --distal--.

Signed and Sealed this

Twelfth Day of October, 2010

David J. Kappos
*Director of the United States Patent and Trademark Office*